A. BUTSCHKO.
HORSESHOE.
APPLICATION FILED AUG. 18, 1910.
985,249.
Patented Feb. 28, 1911.
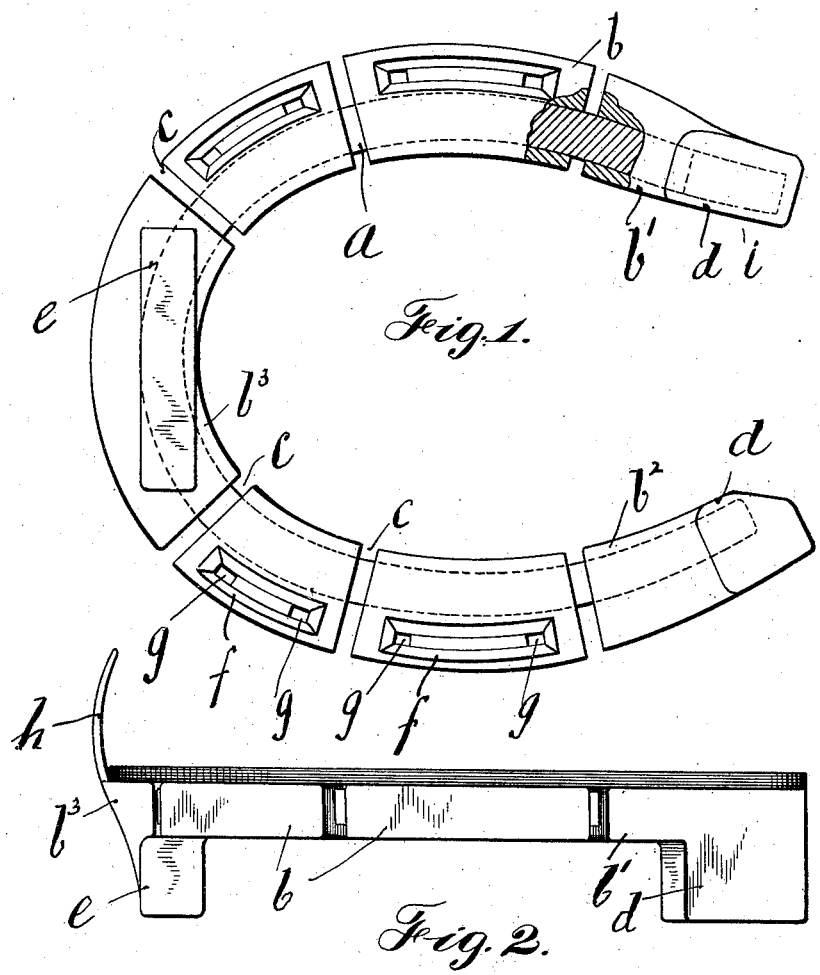

UNITED STATES PATENT OFFICE.

AUGUST BUTSCHKO, OF HOBOKEN, NEW JERSEY.

HORSESHOE.

985,249.  Specification of Letters Patent.  Patented Feb. 28, 1911.

Application filed August 18, 1910. Serial No. 577,885.

*To all whom it may concern:*

Be it known that I, AUGUST BUTSCHKO, a subject of the German Emperor, residing at Hoboken, in the county of Hudson and State of New Jersey, have invented certain new and useful Improvements in Horseshoes, of which the following is a specification.

The present invention relates to horse shoes and has for its object to provide a horse shoe, the manufacture of which will be greatly simplified and which will be so constructed as to be capable of being adjusted according to the shape of the hoof, and which will be more durable than the horse shoes of hitherto known construction.

With these objects in view, my invention consists in the construction, arrangement and combination of parts, which hereinafter will be fully specified.

In the accompanying drawing, which forms a part of the present specification, similar reference letters denote corresponding parts and Figure 1 is a bottom plan view and Fig. 2 a side elevation of the horse shoe.

My horse shoe substantially consists of a flexible core $a$ of steel or other suitable material bent in the form of a horse shoe, and the shoe body proper which is composed of a plurality of sections $b$ of cast steel or the like. These sections are cast around the core, so as to form a solid body therewith and are arranged with narrow spaces $c$ between each other, whereby the horse shoe can be bent more or less together or apart to make it conform with the hoof of the horse to which it is to be applied.

The two end or heel castings $b'$ and $b^2$ may be formed integrally with downward projections forming the heel calks $d$, while the central section $b^3$ may be formed integrally with a downward projection $e$ which forms the toe calk. Each of the sections excepting the central and end sections, is provided at its bottom with a longitudinal groove $f$ in the bottom of which holes $g$ are provided, through which nails can be driven into the hoof for the attachment of the horse shoe. These grooves and holes are arranged near the outer margin of each section beyond the outer circumference of the core. The central section is also provided with an upwardly and inwardly curved nose $h$ which is adapted to embrace the toe portion of the shoe. If desired, the core $a$ at its ends and central portion may be provided with projections around which the calk sections may be cast (as indicated in dotted lines at $i$ in Fig. 1), whereby the calks will be reinforced.

It will be seen that owing to this construction, the horse shoe can be constructed in great quantities to be kept in store for ready use and when a horse shoe is to be applied which does not properly fit, the same can be adjusted by bending.

What I claim and desire to secure by Letters Patent is:

1. A horse shoe, consisting of a flexible metal core and a body composed of a plurality of sections cast around said core and arranged with a space between one another.

2. A horse shoe consisting of a flexible metal core, and a body composed of a plurality of sections cast around said core and arranged with a space between one another, the end sections and the central section being formed integrally with calks.

3. A horse shoe, consisting of a flexible metal core having downward central and end projections, and a body composed of a plurality of sections cast around said core and said projections and arranged with a space between one another.

In testimony whereof I affix my signature in presence of two witnesses.

AUGUST BUTSCHKO.

Witnesses:
 ARTHUR MEEHAN,
 MARTEN SCHNIBLE.

Copies of this patent may be obtained for five cents each, by addressing the "Commissioner of Patents, Washington, D. C."